United States Patent
Gershen et al.

(10) Patent No.: US 6,469,881 B2
(45) Date of Patent: Oct. 22, 2002

(54) SHOCK HAZARD PROTECTION SYSTEM

(75) Inventors: Bernard Gershen, Centerport; Saul Rosenbaum, East Meadow; James N. Pearse, Dix Hills, all of NY (US)

(73) Assignee: Leviton Manufacturing Co., Inc., Little Rock, NY (US)

(*) Notice: Subject to any disclaimer, the term of this patent is extended or adjusted under 35 U.S.C. 154(b) by 0 days.

(21) Appl. No.: 09/961,824

(22) Filed: Sep. 24, 2001

(65) Prior Publication Data

US 2002/0012211 A1 Jan. 31, 2002

Related U.S. Application Data

(63) Continuation of application No. 09/473,785, filed on Dec. 29, 1999, which is a continuation of application No. 09/135,220, filed on Aug. 17, 1998, now Pat. No. 6,016,244, which is a continuation of application No. 08/726,252, filed on Oct. 4, 1996, now Pat. No. 5,801,912, which is a continuation of application No. 08/524,140, filed on Sep. 6, 1995, now Pat. No. 5,583,730, which is a continuation of application No. 08/410,952, filed on Mar. 27, 1995, now abandoned, which is a continuation of application No. 08/138,889, filed on Oct. 19, 1993, now Pat. No. 5,402,298, which is a continuation of application No. 07/979,759, filed on Nov. 23, 1992, now abandoned, which is a continuation of application No. 07/758,173, filed on Sep. 11, 1991, now Pat. No. 5,166,853, which is a continuation of application No. 07/618,271, filed on Jan. 17, 1991, now abandoned, which is a continuation of application No. 07/471,258, filed on Jan. 26, 1990, now abandoned, which is a continuation of application No. 07/352,077, filed on May 15, 1989, now abandoned, which is a continuation of application No. 07/185,571, filed on Apr. 25, 1988, now abandoned, which is a continuation of application No. 07/082,259, filed on Aug. 6, 1987, now abandoned, which is a continuation of application No. 07/001,715, filed on Jan. 9, 1987, now Pat. No. 4,709,293, which is a continuation of application No. 06/880,396, filed on Jun. 30, 1986, now abandoned, which is a continuation of application No. 06/558,260, filed on Dec. 5, 1983, now abandoned.

(51) Int. Cl.$^7$ ................................................ H02H 3/00
(52) U.S. Cl. ................................ 361/42; 361/44; 361/45
(58) Field of Search ............................. 361/42, 44, 45, 361/48, 115, 93.1

(56) References Cited

U.S. PATENT DOCUMENTS

| | | | | | |
|---|---|---|---|---|---|
| 3,813,579 A | * | 5/1974 | Doyle et al. | ................. | 335/118 |
| 3,987,341 A | * | 10/1976 | Clark | ........................ | 324/509 |
| 4,089,031 A | * | 5/1978 | Stevens | ..................... | 307/116 |
| 4,270,158 A | * | 5/1981 | Gilardoni et al. | ........... | 361/178 |
| 4,464,582 A | * | 8/1984 | Aragaki et al. | ............. | 219/242 |
| 4,589,047 A | * | 5/1986 | Gaus et al. | ................... | 361/42 |
| 6,016,244 A | * | 1/2000 | Gershen et al. | ............... | 361/42 |

* cited by examiner

Primary Examiner—Stephen W. Jackson
(74) Attorney, Agent, or Firm—Paul J. Sutton

(57) ABSTRACT

A system protects people and property against electrical shock, using immersion detecting circuits, broken wire test circuits, electromechanical circuit breaking devices including coil/plunger arrangements, and relay circuit breaking mechanisms cooperative with associated circuitry, all of which are able to be incorporated as a system wholly within the load or appliance, and its associated cord set, including a plug.

5 Claims, 8 Drawing Sheets

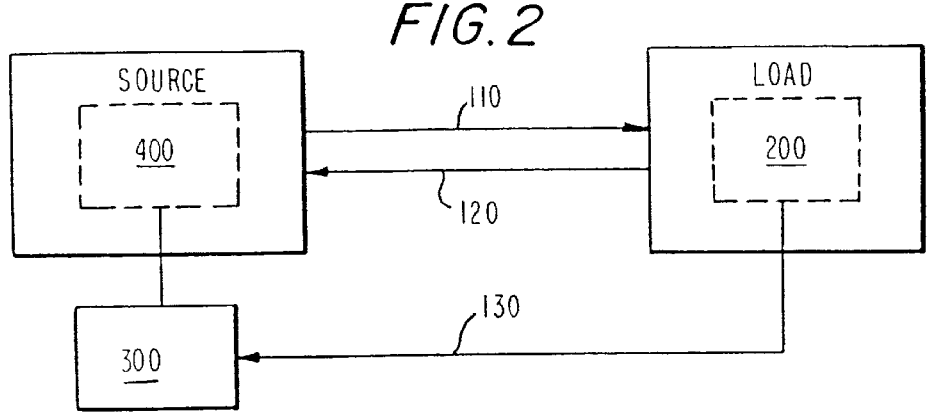
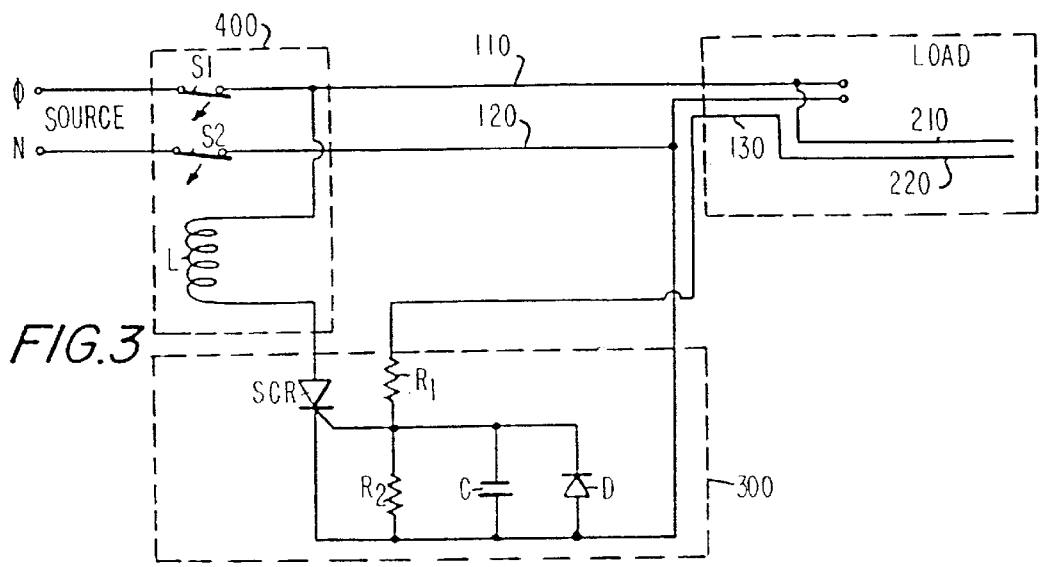
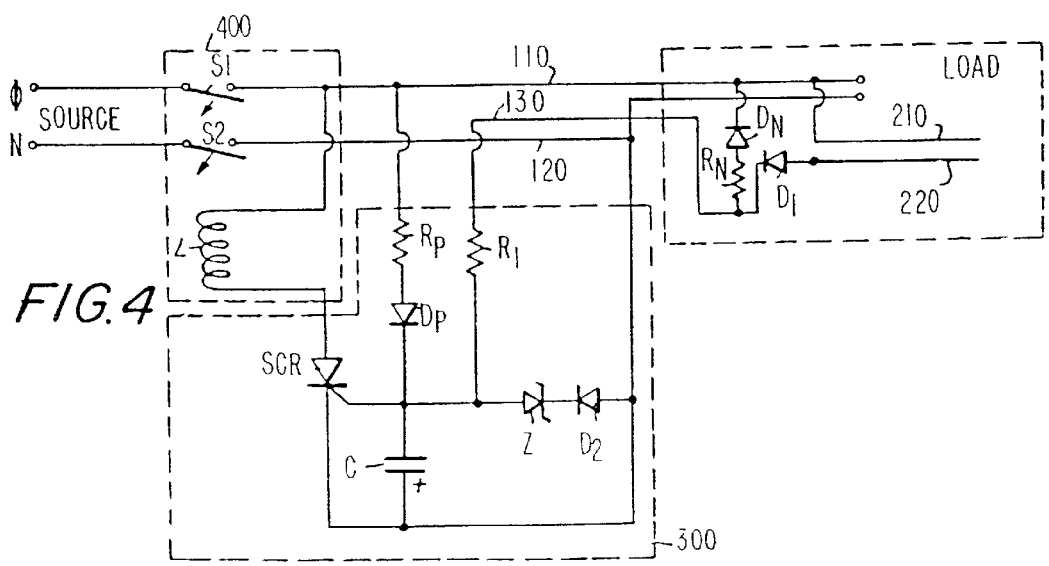

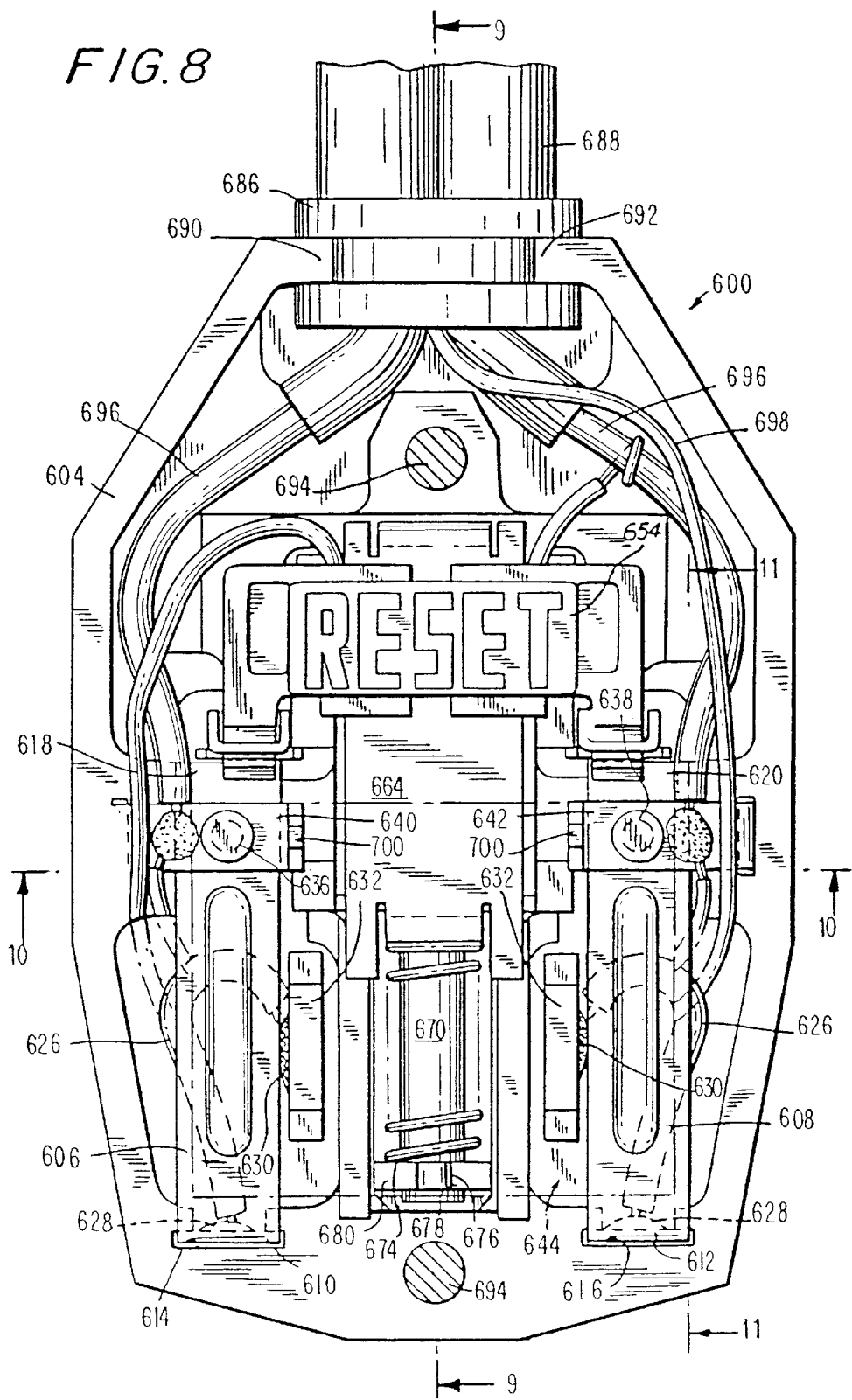

SHOCK HAZARD PROTECTION SYSTEM

CROSS-REFERENCE TO RELATED APPLICATIONS

This application is a continuation of application Ser. No. 09/473,785, filed Dec. 29, 1999; which is a continuation of application Ser. No. 09/135,220, filed Aug. 17, 1998, now U.S. Pat. No. 6,016,244, issued Jan. 18, 2000; which is a continuation of application Ser. No. 08/726,252, filed Oct. 4, 1996, now U.S. Pat. No. 5,801,912, issued Sep. 1, 1998; which is a continuation of application Ser. No. 08/524,140, filed Sep. 6, 1995, now U.S. Pat. No. 5,583,730 issued Dec. 10, 1996; which is a continuation of application Ser. No. 08/410,952, filed Mar. 27, 1995, now abandoned; which is a continuation of application Ser. No. 08/138,889, filed Oct. 19, 1993, now U.S. Pat. No. 5,402,298, issued Mar. 28, 1995; which is a continuation of application Ser. No. 07/979,759, filed Nov. 23, 1992, now abandoned; which is a continuation of application Ser. No. 07/758,173, filed Sept. 11, 1991, now U.S. Pat. No. 5,166,853, issued Nov. 24, 1992; which is a continuation of application Ser. No. 07/618,271, filed Jan. 17, 1991, now abandoned; which is a continuation of application Ser. No. 07/471,258, filed Jan. 26, 1990, now abandoned; which is a continuation of application Ser. No. 07/352,077, filed May 15, 1989, now abandoned; which is a continuation of applicaiton Ser. No. 07/185,571, filed Apr. 25, 1988, now abandoned; which is a continuation of application Ser. No. 07/082,259, filed Aug. 6, 1987, now abandoned; which is a continuation of application Ser. No. 07/001,715, filed Jan. 9, 1987, now U.S. Pat. No. 4,709,293, issued Nov. 24, 1987; which is a continuation of application Ser. No. 06/880,396, filed Jun. 30, 1986, now abandoned; which is a continuation of application Ser. No. 06/558,260, filed Dec. 5, 1983, now abandoned.

BACKGROUND OF THE INVENTION

1. Field of the Invention

This invention relates generally to electrical hazard prevention, and more specifically to a shock hazard prevention system for disconnecting an electrical load from an electrical source when a shock hazard condition exists within the load.

2. Description of the Related Art

Devices for protecting human life and property against electrical shock and damage resulting from a shock hazard condition within an electrical load are known. For example, the model No. 6199 ground fault circuit interrupter (GFCI) marketed by the assignee of the present invention is capable of sensing and responding to the inadvertent grounding of the neutral conductor of an A-C electrical distribution system. It is noted, however, that in certain applications the utilization of such a GFCI is not practical.

In particular, the GFCI is a relatively expensive and complex device which requires the utilization of several transformers. In addition, the GFCI is often hardwired in a wall outlet or receptacle and is neither portable nor readily disconnected. Thus, unless each outlet in which an electrical device such as, for example, an appliance is to be utilized is protected by a GFCI, the user of the appliance is subject to possible injury if a shock hazard condition should exist in conjunction with a non-protected outlet.

In addition, in certain environments the utilization of a conventional GFCI would not afford any shock hazard protection to the user of an appliance. More specifically, a conventional GFCI device of the type known to applicants will not be effective or work if the user of an electrical appliance drops the appliance in a plastic insulated bathtub.

Another potential drawback, exists regarding the use of a GFCI for certain types of portable electrical appliances such as, for example, a hair dryer. Although the owner of a hair dryer may have his or her residence outlets adequately protected by GFCI device, it is possible that other places, such as hotel, the residence of relatives, friends, etc., where it is desired to use the hair dryer may not be protected by such devices.

Accordingly, it is clear that what is needed is a shock hazard protector which is associated with the appliance to be protected itself rather than with the electrical outlet in which the appliance is plugged and energized. It is believed that prior to the present invention, this need has gone unfulfilled.

A need exists for a shock hazard protector which possesses attributes including having a minimum number of components, reliability, cost and portability.

BRIEF SUMMARY OF THE INVENTION

It is accordingly a general object of this invention to overcome the aforementioned limitations and drawbacks associated with the known devices and to fulfil the needs mentioned by providing a hazard protection system having all of the desirable attributes noted above.

It is a particular object of the present invention to provide a shock hazard protector capable of disconnecting an electrical source from an electrical load in response to the detection of a shock hazard condition within the electrical load.

Another object of the present invention is to provide a shock hazard protector capable of detecting and responding to a water-related shock hazard condition within an electrical appliance.

A further object of the present invention is to provide a shock hazard protection system, as above, incorporating immersion detection circuitry.

A still further object of this invention is to provide a shock hazard protection system, as above, wherein a feature is provided for detecting a possible break or discontinuity in a sensing or guard wire.

Yet another object of this invention is to provide a system, as above, wherein a solenoid-type electromechanical mechanism acts as a circuit breaking or interrupting means.

A further object is to provide such a system wherein a relay and associated circuitry and mechanical means enable the desired result.

Yet a further object of this invention is to provide a detection system which detects or senses the presence of a conductive medium, and which causes an event in response thereto.

Another object of this invention is to provide a detection system which detects or senses the absence of the presence of a conductive medium, and which causes an event in response thereto.

Other objects will be apparent from the following detailed description and practice of the invention.

The foregoing and other objects and advantages which will be apparent in the following detailed description of the preferred embodiment, or in the practice of the invention, are achieved by the invention disclosed herein, which generally may be characterized as a hazard protector. The hazard protector includes detecting means associated with a load for detecting a hazard condition within the load, an interrupting means associated with a source to which the load is operatively connected, and conducting means connected between the detecting means and the interrupting means. In response to the detection of a hazard condition within the load by the detecting means, the interrupting means operatively disconnects the source from the load.

BRIEF DESCRIPTION OF THE SEVERAL
VIEWS OF THE DRAWINGS

Serving to illustrate exemplary embodiments of the invention are the drawings, in which similar elements are given similar reference characters, and of which:

FIG. 2 is a block diagram of the shock hazard protector, in accordance with the present invention;

FIG. 3 is a schematic diagram of one embodiment of the shock hazard protector, in accordance with the present invention;

FIG. 4 is a schematic diagram of a second embodiment of the shock hazard protector, in accordance with the present invention;

FIG. 8 is an elevational view of the cord set plug illustrated in FIG. 1 and taken along line 8—8 of that same FIG. 1 depicting the assembled plug with its cover removed;

DETAILED DESCRIPTION OF THE INVENTION

Figure 1:
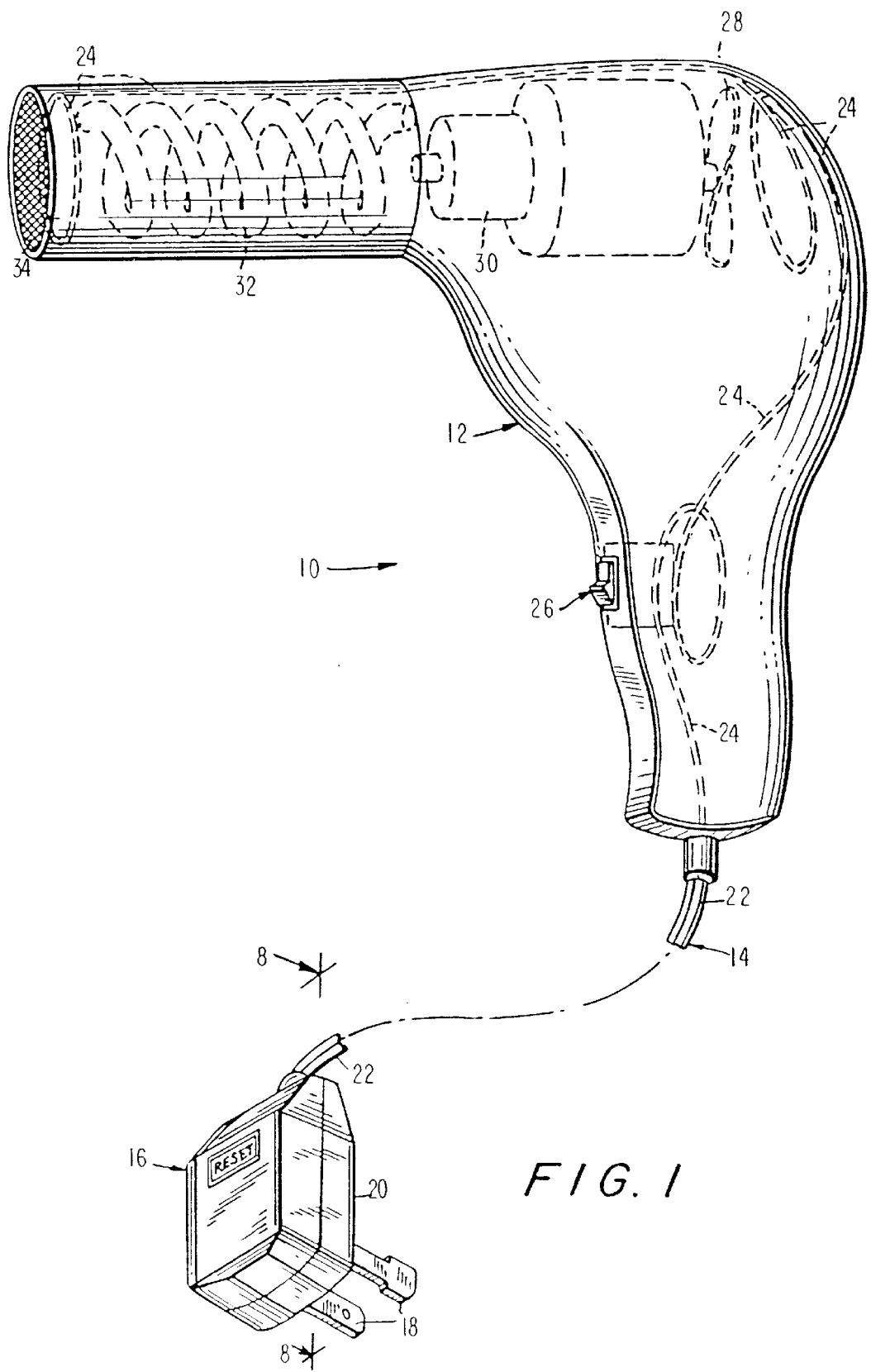
FIG. 1 is a perspective-type view of a hair dryer and its associated cord set incorporating the system according to the present invention.

Referring now in more detail to the drawings, FIG. 1 is presented in its form to illustrate a hair dryer 12 and its associated cord set 14 as wholly containing and constituting or comprising the shock hazard protection system 10 of the present invention. It is applicants' intention and desire to emphasize here the fact that this invention contemplates an electrical appliance, such as of the personal health care type (hair dryers, etc.) which possesses all of the features and advantages of the invention. It is also an intention of applicants to provide the system of the present invention in the form of an OEM product available for sale to manufacturers of such appliances.

A plug assembly 16 is illustrated in FIG. 1 as including polarized blades 18 extending from housing 20. Whereas commercially available hair dryers, as an example of a personal health care appliance, normally include a cord set having two conductors or wires, a third wire 22 is illustrated in the case of cord set 14 electrically communicating with a bare copper wire 24 whose path (in the example give in FIG. 1) includes proximity to an looped circuit near a dryer housing opening through which an on-off switch assembly 26 extends, and thence upward to another loop proximate a dryer housing air inlet opening through which fan 28 driven by motor 30 pulls air to be heated by heating coil 32 before exiting the dryer housing air outlet opening in which grill 34 is positioned. Afte leaving the second loop described as being adjacent the air inlet opening wire 22 extends to a third loop adjacent grill 34.

Since heater coil 32 carries and operates on current in the "hot" or phase line, and with the provision of conductor or wire 24 wired as part of the neutral side of the line, the presence of a conductive medium such as, but not limited to, moisture or water between them will create a conductive path contemplated by the invention as enabling interruption of current to the load 12. This embodiment is distinguishable from another embodiment of the present invention wherein a pair of conductors, as opposed to a single guard or sensing conductor 24, are located at or near moisture/water housing penetration points. Configurations of one or more sensing or guard conductors other than those illustrated herein are contemplated as coming within the scope of this invention.

Referring to FIG. 2, a block diagram of a shock hazard protector according to the present invention is illustrated. As shown therein, it comprises a source operatively connected to a load by first and second conductors 110 and 120, respectively, a detector 200 associated with the load, a control circuit 300 connected to the detector by a sensing or third conductor 130, and an interrupter circuit 400 associated with the source and connected to the control circuit 300. In the case of an electrical A-C source, conductors 110 and 120 are tied to a phase and the neutral terminal, respectively, of the A-C source.

In the normal mode of operation, that is, in the absence of a hazard condition within the load, the control circuit 300, which changes from a first state to a second state in response to the detection of a hazard condition within the load, remains in the first state. Upon the detection by detector 200 of a predefined fault or hazard condition within the load, the control circuit 300 changes from the first to the second state, which causes the interrupter circuit 400 to operatively disconnect the source from the load.

It is noted that the present invention contemplates certain applications where the system sensitivity need not be accurately controlled, and the control circuit 300 can be eliminated. In this situation the interrupter circuit 400 is connected to the detector 200 by the third conductor 130, and responds directly to the detection by detector 200 of a hazard condition within the load.

In either situation, the sensing or third conductor 130 communicates the presence of the hazard condition within the load to the control circuit 300 or the interrupter circuit 400.

Referring now to FIG. 3, a schematic diagram of one embodiment of the invention particularly suited for use in conjunction with water-related shock hazard conditions within ran electrical appliance operatively connected to an A-C source (not shown) by electrical conductors 110, 120, respectively, is illustrated. As shown therein, detector 200 comprises a pair of hazard or immersion detection conductors 210 and 220, which are positioned in a non-contacting relationship and contained within the electrical load. A pair of immersion detection conductors 210 and 220 are preferably located in proximity to each port of the appliance to be protected where water can enter.

For ease of description, it will be assumed that the appliance to be protected only contains one port or opening through which water may enter. For this situation, one end of one of the pair of immersion detection conductors 210 is operatively connected to the phase terminal of an A-C source (not shown) via electrical conductor 110, and one end of the second of the pair of immersion detection conductors 220 is connected to the load end of the third electrical conductor 130. The other ends of immersion detection conductors 210, 220 are unconnected and are maintained in a spaced-apart relationship, typically for example, not more than one inch.

Shock hazard or immersion detection conductors 210, 220 may comprise, for example, a pair of bare electrical conductors or a pair of conducting plated lines on a printed circuit board or other physical configurations that will enable a conductive path between the unconnected ends thereof.

Control circut 300 comprises a solid state switching control circuit and includes a first ressitor R1 connected in-line between the gate of a silicon controlled rectifier SCR and the source end of the third electrical conductor 130. Resistor R1 limits the current applied to the gate of the SCR. In addition, control circuit 300 includes a parallel network comprising resistor R2, capacitor C and diode D connected between the gate and cathode of the SCR. These components provide a measure of noise immunity and protection against damage across the gate to cathode junction of the SCR.

Interrupter circuit 400 comprises an electromechanical interrupting circuit and includes an energizing coil L and a first and second contact or switch S1, S2 connected in-line with the first and second electrical conductors 110, 120, respectively. Switches S1 and S2 are responsive to the flow of current through energizing coil L and are closed when such current is not flowing. In response to the flow of such current they switch from the normally closed position to the shock hazard condition open position. One end of energizing coil L is connected to the first electrical conductor 110 and the other end thereof is connected to the anode of the SCR. The cathode of the SCR is operatively connected to the second electrical conductor 120.

The existence of a water-related shock hazard condition within the electrical appliance is detected when both unconnected ends of the pair of immersion detection conductors 210, 220 are immersed in water. More specifically, the immersion of both unconnected ends of the pair of immersion detection conductors 210, 220 causes the electrical A-C source to be operatively connected to the gate of the SCR via the path provided by the first electrical conductor 110, the first immersion detection conductor 210, the electrically conducting path provided by the water in which the unconnected ends of the first and second immersion detection conductors 210, 220 are immersed, the second immersion detection conductor 220, the third electrical conductor 130, and resistor R1. In response thereto, the SCR switches from the normally non-conducting state to the shock hazard condition conducting state, thereby providing a path for current to flow through the energizing coil L causing switches S1 and S2 to switch from the normally closed position to the shock hazard condition open position and thus operatively disconnecting the A-C source from the electrical appliance.

To insure that the shock hazard protector is operable prior to utilization of the appliance it protects, a test circuit (not shown) comprising, for example, a resistor in series with a normally open switch connected between the pair of immersion detection conductors 210, 220 may be utilized. Closing the normally open switch causes the resistor to be conneted across the immersion detection conductors and, if the shock hazard protector is operating, as described above, causes the A-C source to be operatively disconnected from the appliance. Preferably, the test circuit is contained within the electrical appliance. In conjunction with said test circuit, diode D could be replaced with a light-emitting-diode (LED). If the LED is illuminated with the test switch in the closed position it indicates that the shock hazard protector is not operating properly.

Preferably, electrical conductors 110, 120 and 130 comprise a three wire conductor having an A-C source compatible plug at the source end, the control circuit 300 and interrupter circuit 400 are contained in the plug, and the detector 200 is contained within the appliance.

Thus in the case where the electrical appliance is, for example, a hair dryer, the detector 200 would be located internally within the dryer and, as noted above, in proximity to each port thereof where water can enter the dryer. It should be emphasized here that while water is given as the electrically conductive medium,this invention contemplates a response to any electrically conducting medium, such that the appliance is electrically disconnected from the A-C source in response to the presence of such a conductive medium.

Exemplary values for the circuit illustrated in FIG. 3 are as follows: $R_1$-2000 ohms, $R_2$-1000 ohms, C-0.1 microfarads, D-1N4004, SCR-2N5064.

Referring now to FIG. 4, a schematic diagram of a second embodiment of the present invention particularly suited for use in conjunction with water-related shock hazard conditions within an electrical appliance is illustrated. This embodiment provides an additional feature not present in the first embodiment illustrated in FIG. 3. In particular, the embodiment illustrated in FIG. 3, provides shock hazard protection if any of electrical conductors 110, 120, individually or in combination, are broken, but does not provide shock hazard protection if electrical conductor 130 is broken. The embodiment illustrated in FIG. 4 provides an additional measure of shock hazard protection by rendering the electrical appliance inoperative if any of electrical conductors 110, 120 and 130, individually or in combination, are broken.

This additional measure of protection is provided by the addition of a first diode $D_1$ connected in series between the second immersion detection conductor 220 and the third electrical conductor 130, the replacement of the capacitor connected between the gate and cathode of the SCR with an appropriate chargeing capacitor, the addition of a first charging circuit comprising resistor $R_N$ and diode $D_N$ connected between the first and third electrical conductors 110, 130, the addition of a zener diode Z in series with the diode $D_2$ connected between the gate and cathode of the SCR, the addition of a second charging circuit comprising resistor Rp and diode Dp connected between the first electrical conductor 110 and the gate of the SCR, and the elimination of resistor R2 connected between the gate and cathode of the SCR.

The operation of the circuit illustrated in FIG. 4 is as follows. Assuming that the sensing of third conductor 130, is intact, the appliance is not immersed in water and that it is energized, during the negative half cycle of the A-C signal on electrical conductor 110 a negative charging path via diode $D_N$, resistor $R_N$, third conductor 130, resistor R1 provides charge to capacitor C, thereby charging it negatively. During the positive half diode $D_N$ blocks, however a positive charging path via resistor Rp and diode Dp provides charge to capacitor C, thereby charging it positively. Since the time constant of resistor $R_N$ and capacitor C, is roughly 33 times greater than the time constant of resistor Rp and capacitor C, the capacitor C charges much faster in the negative sense, so that under steady conditions a negative voltage exists on the gate of the SCR thereby keeping it in a non-conducting state. In order to limit that negative voltage to a value that would not damage the gate to cathode junction of the SCR a three volt zener diode is added in series with diode $D_2$, also in parallel with capacitor C.

The next condition to look at is a broken third conductor 130. Under this condition a negative charging path no longer exists for the negative voltage to be impressed on capacitor C, and, therefore during positive half cycles capacitor C will discharge positively and eventually the voltage on the gate of the SCR will get high enough to trip the SCR, causing it to switch to the conducting state thereby operatively disconnecting the A-C source from the appliance, putting the appliance in a safe condition. Exemplary values for the circuit illustrated in FIG. 4 are as follows: $D_1$, $D_2$, $D_N$, Dp-1N 4004, $R_N$-30,000 ohms, Rp-1,000,000 ohms, $R_1$-2000 ohms, C-1 microfarad, SCR-2N5064, Z-3 volt zener diode.

Preferably, the components comprising the first charging circuit $R_N$, $D_N$ and diode $D_1$ are contained within the electrical appliance and are waterproof, the components comprising the second charging circuit Rp, Dp and the zener diode D are contained in the plug.

It is noted that with minor modifications the above described invention has many other applications. For example, in the situation where the electrical appliance comprises a power tool, such as, a drill, having an electrically conducting housing the teachings of the present invention may be utilized by eliminating immersion detection conductor 220 and connecting the third electrical conductor 130 to the electrically conducting housing. The immersion in water of the unconnected end of shock hazard detection conductor 210 provides an electrically conductive path between the shock hazard detection conductor and the electrically conducting of the drill causing, as described above, the drill to be operatively disconnected from the A-C source.

Figure 5:
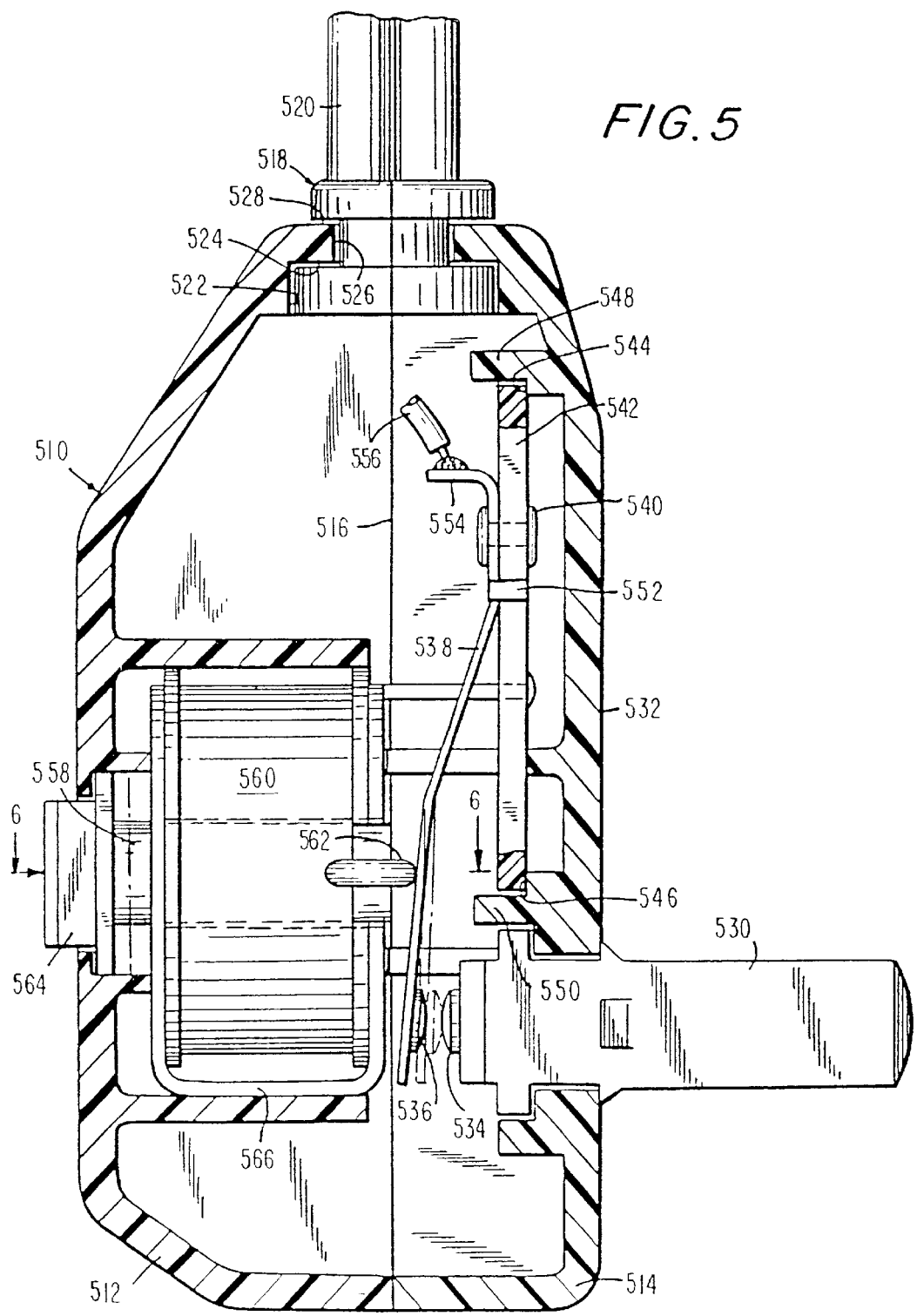
FIG. 5 is an enlarged partial sectional elevational view taken through a cord set plug of a relay embodiment of the present invention.

Referring now to an embodiment of the present invention which utilizes the approach of a relay mechanism to accomplish the circuit interrupting goal of the invention, FIG. 5 illustrates a shock hazard protector embodiment of a plug assembly 510 formed with a housing with a base and cover body halves 514 and 512, respectively, joined at a housing reference line 516. A strain relief 518 comprises part of cord 520 and, in cooperative combination with the shape and contour of annular surfaces 522, 524, 526 and 528, serves as a means for protecting the integrity of electrical connections during use.

Blades 530 extend outwardly from surface 532 of base half 514 and serve the function of matingly and electrically engaging electrical contacts within a receptacle (not shown) or electrical outlet in the home, for example. A fixed contact 534 is associated and integral with each of the blades 530, contacts 534 being fixed or stationary as opposed to movable when assembled.

A pair of movable contacts 536 are provided and are integral with leaf springs 538 which, in turn, are anchored by means of eyelets 540 extending through openings in an end portion of the leaf springs 538 spaced from the movable contacts 536. These eyelets further extend through openings through a printed circuit board 542 supported by ledges 544 and 546 adjacent upstanding walls 548 and 550, as shown in FIG. 5.

A tab 552 associated with each leaf spring 538 further anchors the leaf springs to the printed circuit board in spaced relationship with respect to the aforesaid eyelets, thereby serving an additional function of preventing undersirable rotation of the leaf springs 538, assuring alignment and reliably repeated engagement between the fixed and movable contacts 534 and 536, respectively. Leaf springs 538 are configured to normally bias the movable contacts 536 away from the fixed contacts 534 when in an unstressed condition, thereby normally interrupting an electrical path between these contacts. The ends of leaf springs 538 are formed with upstanding flanges 554 to which conductors 556 are connected.

Figure 6:
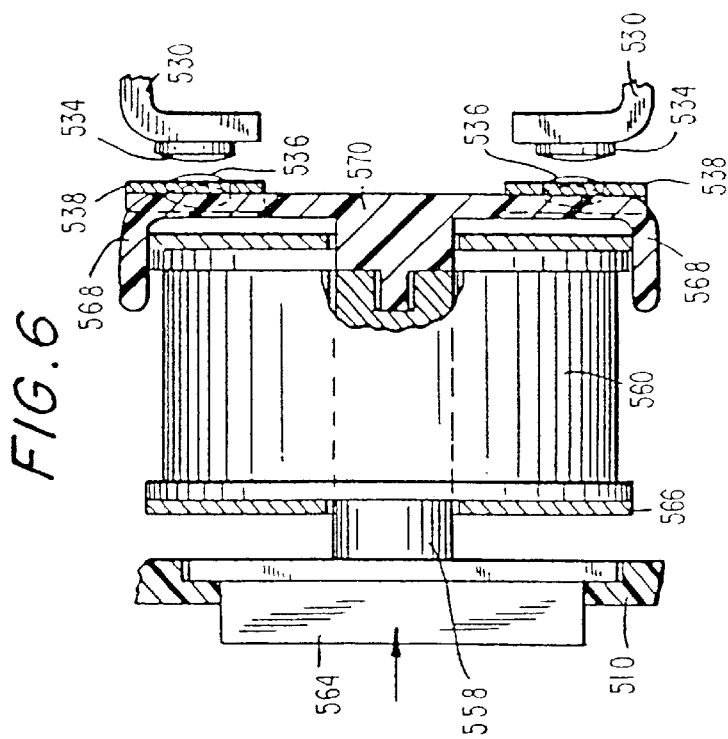
FIG. 6 is partial fragmentary sectional plan view taken along the line 6—6 of FIG. 5.

A plunger or core 558 is disposed vertically within a bobbin coil 560, as illustrated in FIG. 5. A reset button 564 contacts the uppermost portions of plunger 558, while a butterfly cross bar 562 extends laterally across the plug housing and in contact with upper surfaces of leaf springs 538. The upward biasing forces of leaf springs 538 maintain the cross bar 562, plunger 558 and reset button 564 in the positions shown in FIG. 5, while a metal strap 566 extends about portions of coil 560 as shown. The cross sectional shape of reset button 564 is polygonal, such as square, to prevent rotation thereof, while the cross sectional shape of core or plunger 558 is round to provide maximum electromagnetic efficiency in its interaction with bobbin coil 560. FIG. 6 illustrates in a cross sectional view of the "butterfly" cross bar 566 with arms 568 being splayed outwardly from a center rivet member 570 aligned with plunger 558.

In operation, power for the printed circuit board electronic components is supplied by a copper path on the board via pins 572 extending downwardly from the bobbin coil 560. Prior to a shock hazard predetermined condition, the system of FIG. 5 is "set" by means of depressing set or reset button 564 inwardly, which results in movement of the plunger 558 and the cross bar 562 against the opposing biasing forces of leaf springs 538. This depression of the set or reset button 564 will result in movement of the leaf springs 538 until the moveable contacts 536 engage the fixed contacts 534, thereby completing an electrical circuit.

The completion of the electrical circuit just described results in current flow to the bobbin coil 560 which, in turn, electromagnetically "keeps" and holds the plunger in its depressed position until an interruption of such current flow. The interengagement of the movable and fixed contacts 536 and 534, respectively, further serves to enable the supply of power to the load or appliance with which the inventive assembly of FIG. 5 is associated, again, until an interruption in current flow to the bobbin coil 560.

In the event of the presence of a shock hazard condition, as a result of the operation of circuitry of FIG. 7 described in detail below, current to the bobbin coil 560 is interrupted, with the result that the upward biasing forces of leaf springs 538 rapidly cause a separation of the movable contacts 536 away from the fixed contacts 534, thereby in turn causing an interruption of power from the source through the blades 530 to the load or appliance.

Figure 7:
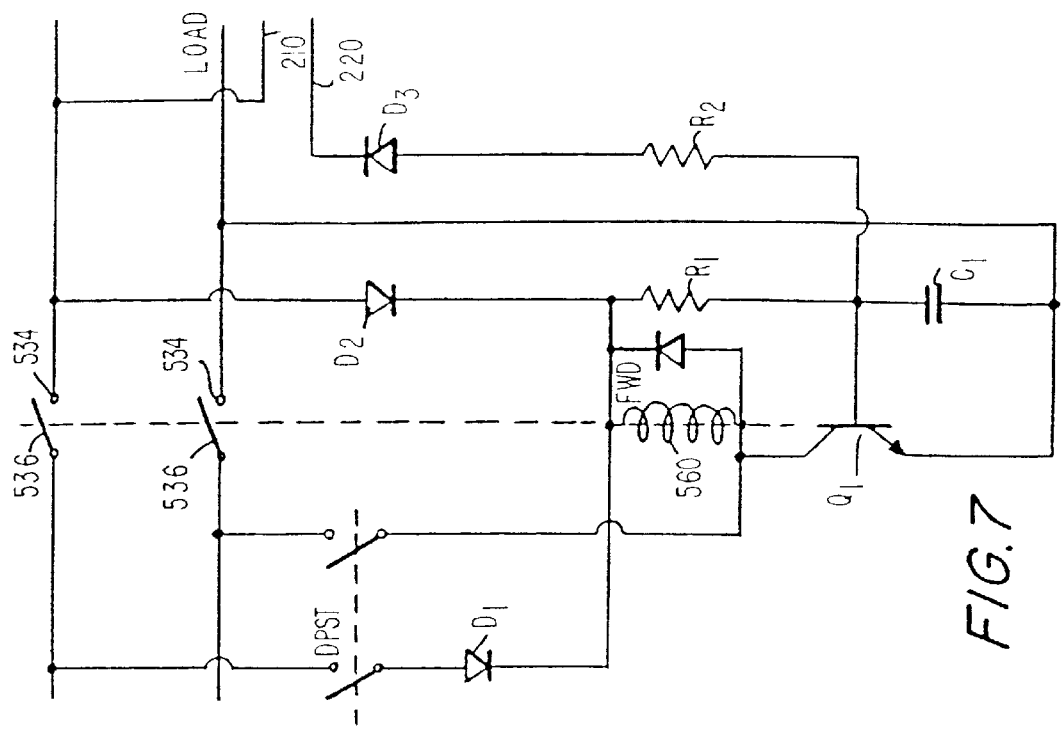
FIG. 7 is a schematic circuit diagram of the embodiment of the present invention associated with FIGS. 5 and 6.

Referring now to FIG. 7 of the drawings, the aforesaid circuitry associated with the device of FIG. 5 is illustrated with like components in FIGS. 5 and 7 carrying like reference characters. With the relay of FIG. 5 being fed with half wave rectified alternating current, or pulsating direct current, there is some current flow during the negative half cycle or the half cycle other than that when line current is flowing. A free wheeling diode FWD continues current flow.

The main contacts 534, 536 are normally open. When it is desired to turn on the appliance after plugging it into a receptacle power source, pushing a momentary double pole, single throw switch DPST, (set or reset button 564) closes the circuit from the power source to the bobbin core 560. This applies half wave rectified direct current to the bobbin coil 560. This results in applying a voltage from the phase line through the double pole single throw switch DPST, through a diode $D_1$, thence through the bobbin coil 560, with the other end of the coil going through another contact of the double pole switch DPDT to neutral line. Thus, by pushing the switch or reset button 564, the coil 560 is energized, and the main contacts 534, 536 are closed.

Once the main contacts 534, 536 are closed, a parallel path for the current is provided through another diode $D_2$, such that there is current flow from phase line through diode $D_2$ through the coil 560 with its free wheeling diode FWD in parallel with it, thence through the collector of a transistor $Q_1$, the emitter of the transistor $Q_1$ being connected to neutral line. The transistor $Q_1$ is kept on by a resistor $R_1$ going form phase line to the base.

Once the coil 560 energizes itself as described, the transistor $Q_1$ is turned on and then the momentary contact of the double pole, single throw switch is released and the coil 560 is self-holding. Should the load or appliance be dropped into water, creating a shock hazard condition, the current in the sense line 220 is rectified by diode $D_3$ and a resistor $R_2$ puts a negative voltage onto the base of the transistor $Q_1$. A capacitor C1 is provided between the transistor base and the emitter which will essentially store whatever voltage was present to smooth it out. By setting the value of resistor $R_2$ relatively small with respect to the value of resistor $R_1$, the time constant of the negative current is shorter than that of the positive current and in this way there is a negative charge turning off the transistor with the result that the movable contacts 536 separate from the fixed contacts 534 (FIG. 5).

The reader is cautioned not to construe the examples presented in this specification, such as in describing hair dryers or other appliances, as limiting the invention to these examples. Any electrical appliance or apparatus with which a shock hazard may be associated is contemplated as being favorably affected by the advantages and features of the present invention.

Referring now to another embodiment of the present invention illustrated in a FIGS. 8–12, wherin a novel electromechanical and electromagnetic combination provides a circuit interrupting or breaking function, as well as other functions. In FIG. 8 a plug assembly 600 of the type designated reference character 16 in FIG. 1 is shown with cover housing half 602 removed to illustrate base housing half 604 with its assembled subassemblies in place. A pair of movable contact arms 606 and 608 are each anchored at their respective angled depending legs 610 and 612 within slots or recesses 614 and 616 of base housing half 604. Near ends 618 and 620 of movable arms 606 and 608, respectively, remote from their depending legs 610 and 612, silver contacts 622 and 624 are riveted to its arm.

Flexible condutors 626 are welded at 628 to depending legs 610 and 612 at one of their ends, and at their other ends 630 the flexible conductors are welded to plug insertion blades 632. Blades 632 are configured with mounting shoulders 634 so as to be held relatively integral with base 604 when assembled.

Figure 11:
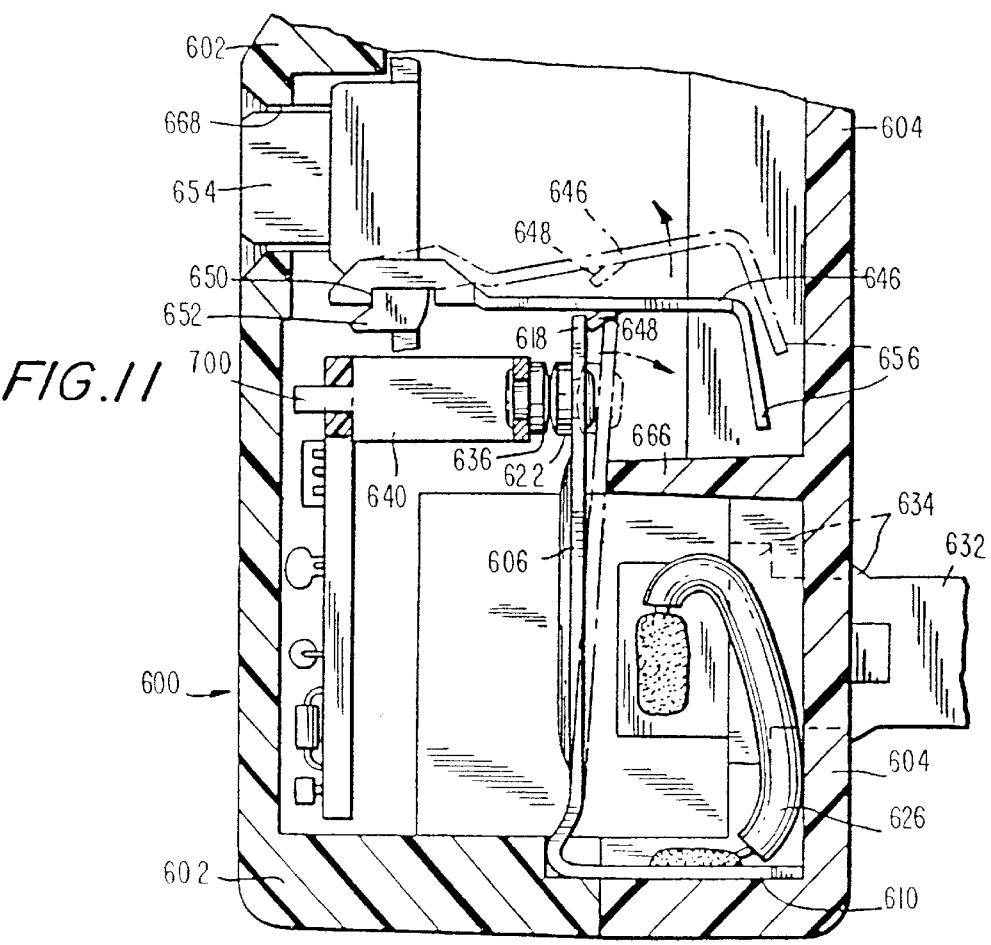
FIG. 11 is a fragmentary sectional view taken along line 11—11 of FIG. 8.

Movable contact arms 606 and 608 are normally biased in the direction shown in phantom lines within FIG. 11 such that they bias the silver contacts 622 and 624 away from fixed silver contacts 636 and 638 which are riveted to fixed contact terminals 640 and 612, respectively. The fixed contact terminals 640 and 642 themselves are physically and electrically connected to a printed circuit board 644 which carries one of the electrical circuit embodiments described above and contemplated by the invention.

A latch member 646 formed with a tang 648 is associated with each movable contact arm and each is mounted an pivoted at its upper end on pivot points 650 formed on legs 652 of a set/reset button 654. At their lower ends 656, latches 646 are formed with downward bend or leg, as viewed in FIG. 11, these latter legs giving the latches structural stability for added reliability. The full lines of FIG. 11 illustrates latches 646 in their latched or set position, with tangs 648 holding the ends of movable contact arms 606 and 608 such that movable silver contacts 622 and 624 are in physical and electrical engagement with fixed silver contacts 636 and 638, thereby enabling current flow through blades 632 from a source such as an electrical receptacle to a load, such as hair dryer 12.

Figure 9:
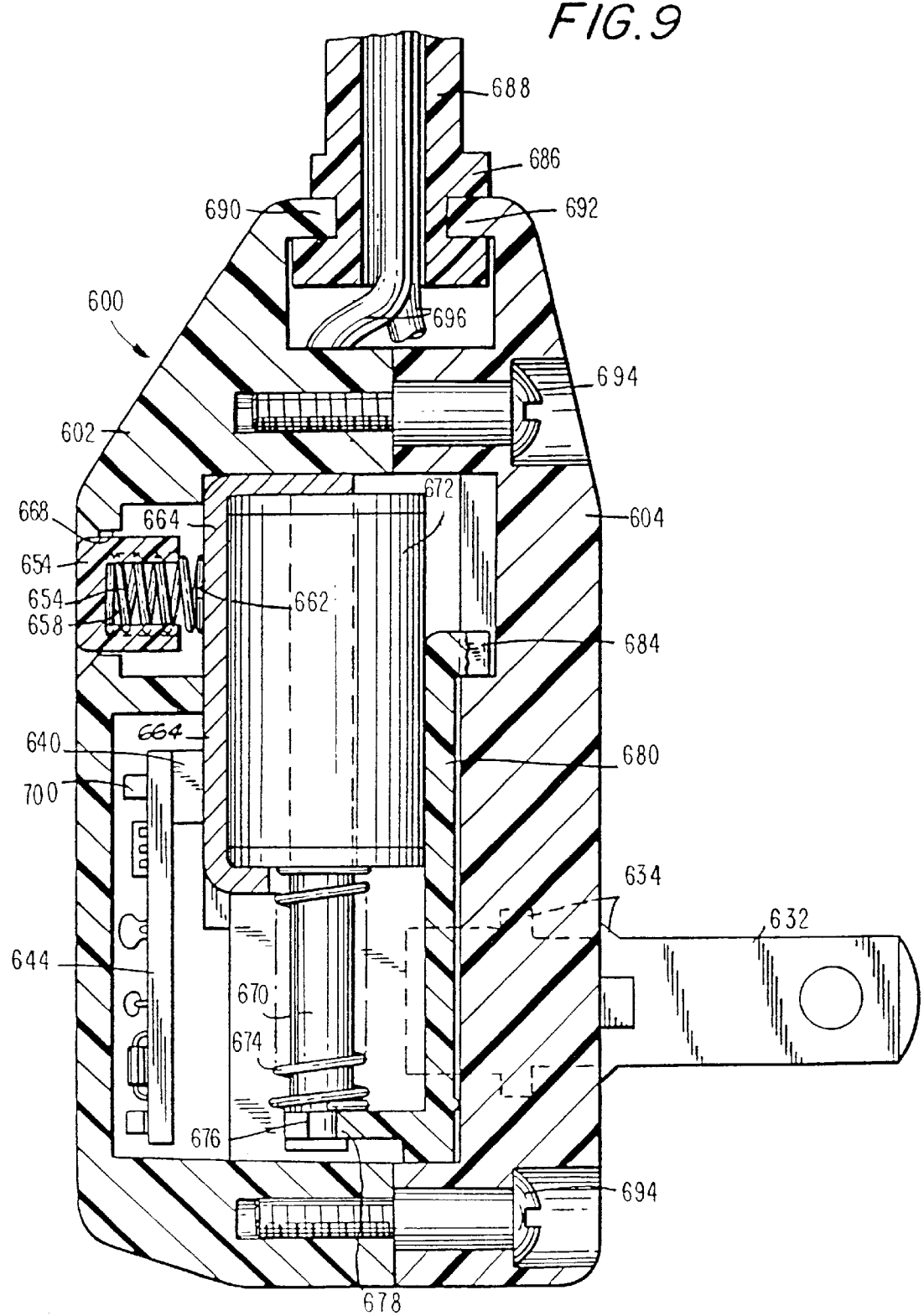
FIG. 9 is a partial sectional elevational view taken along line 9—9 of FIG. 8.
Figure 10:
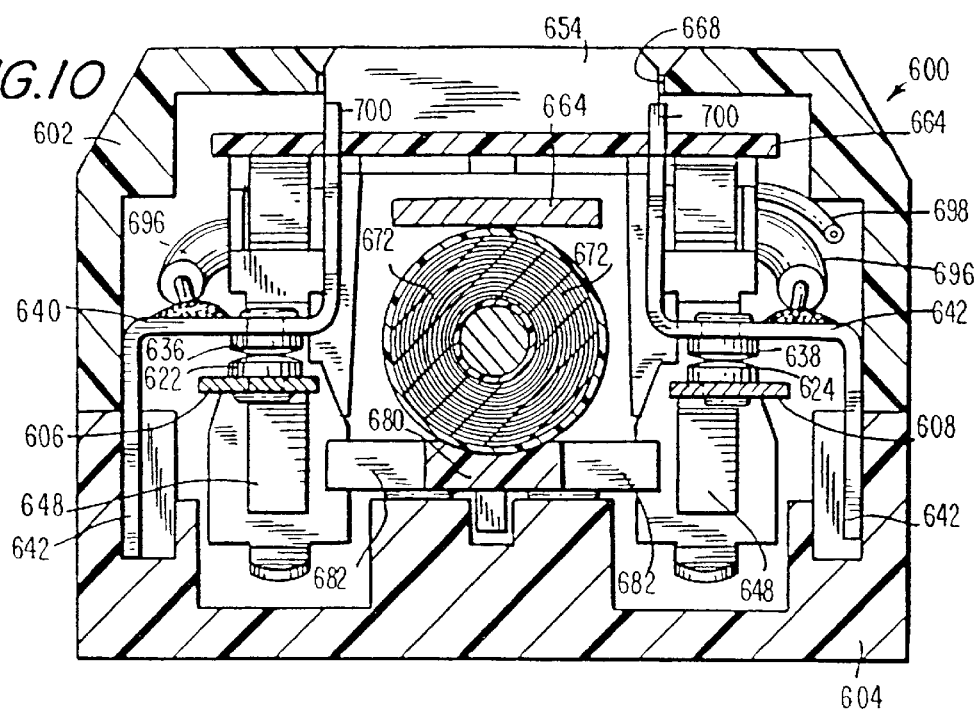
FIG. 10 is a sectional view taken along line 10—10 of FIG. 8.
Figure 12:
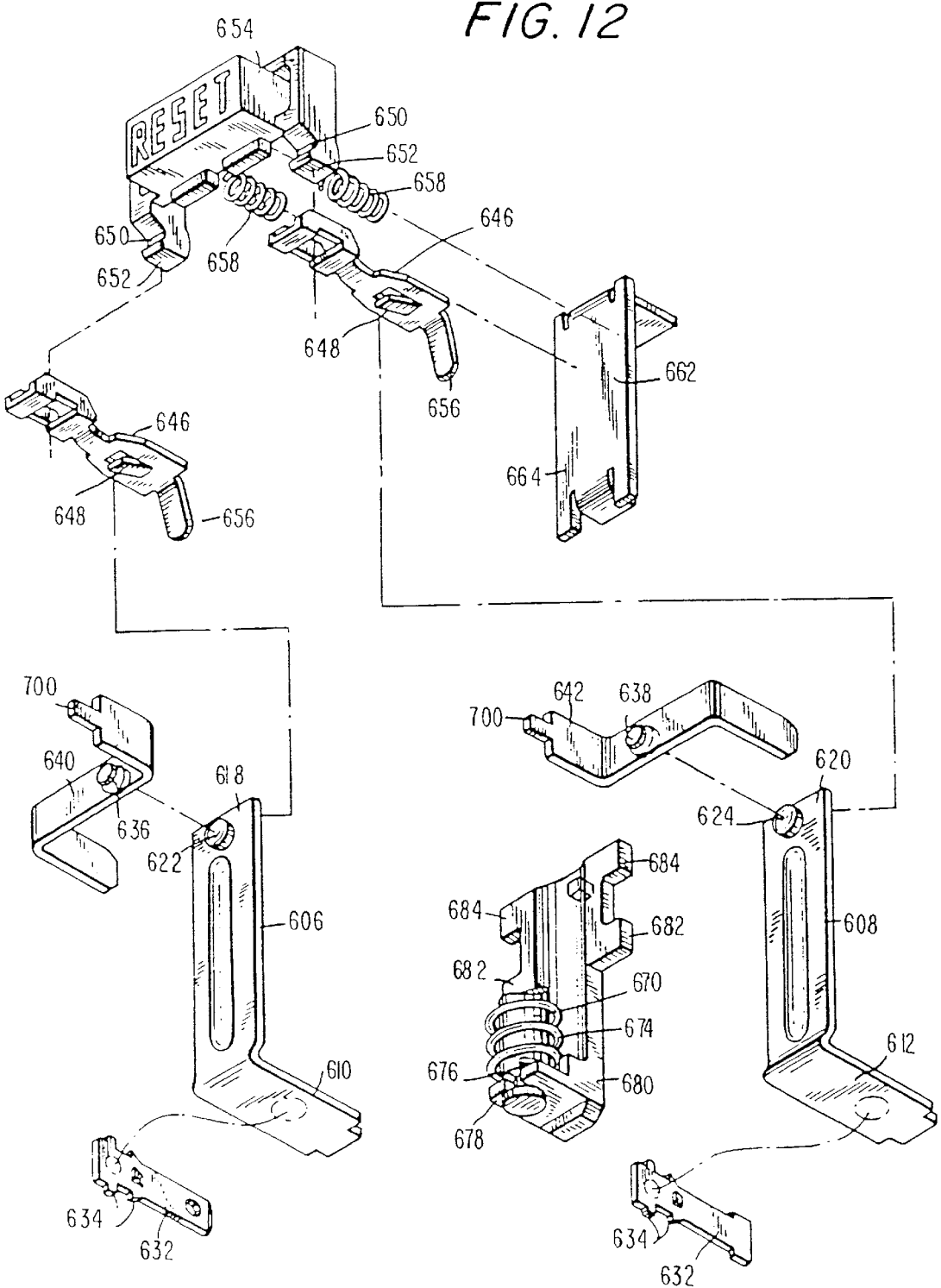
FIG. 12 is an exploded-type perspective view of components of the present invention illustrated in FIG. 8.

Reset button 654 is normally biased in a direction away from blades 632 by means of helical compression springs 658 shown in FIGS. 9 and 12, for example. Springs 658 are held captive between and exert forces against opposing surfaces 660 and 662 of the underside of the reset button 654 and a metallic frame 664 (see FIG. 9) Set/reset button 654 is visible to the user through a window 668 formed within cover housing half 602 and preferably carries indicia of the type illustrated in FIG. 8 to draw attention to its function.

When the movable contact arms 606 and 608 are in the positions shown in FIG. 11 in phantom outline, resting against a wall 666 formed in base housing half 604, such that the electrical circuit is in an interrupted state with the movable and fixed contacts 622, 624 and 636, 638, respectively, spaced in opposition with respect to one another, the user of the present invention is able to close the circuit, assuming no hazard condition is present, by depressing with his or her finger the set/reset button 654. This depression of the button 654 causes latches 646 to move in the same direction as the movable button 654 and in sliding engagement with the ends of the movable contact arms 606 and 608 until and such that tangs 648 ride over these arm ends. Release of the formerly depressed button 654 results in its only partially returning under the influence of springs 658 towards its original position, with a resulting pulling of the movable contacts 622 and 624 into engagement with their respective opposing contacts 636 and 638 by latch tangs 648 against the undersides of the movable arm ends 618, 620, thereby setting the system and closing the circuit.

Latches 646 and their tangs 648 hold the movable contacts 622, 624 in the position just described until a hazard condition is sensed or detected. In such an event, a plunger 670 shown in FIGS. 8 and 9 as being normally biased away from its associated winding or coil 672 by means of a helical compression spring 674 is caused to rapidly approach the core of coil 672 as a result of its being energized. Plunger 670 is formed with a neck 676 adjacent its end remote from coil 672, with which a clevis 678 of what will here by referred to as a banger 680 matingly engages. Banger 680 is further formed with pairs of trip and reset dogs 682 and 684 movable paths that coincide with latch 646. Upon energization of coil 672, trip dogs 682 rapidly come into contact with and "bang" against the surfaces of latches 646 facing wall 666, forcibly disengaging the latches 646 and their tangs 648 from the movable contact arms 606, 608, with the result that these arms 606, 608 return to their rest positions against wall 666, and intertupt current flow through the movable and fixed contacts 622, 624 and 636, 638, respectively. Once the current is interrupted, the compression forces within spring 674 cause the plunger 670 and its interconnected banger 680 to return to the position illustrated in FIG. 9, with the reset dogs 684 coming into contact with and biasing the latches 646 against the ends 618, 620 of the movable contact arms 606 and 608.

Frame 664 comprises part of the magnetic circuit associated with an operating winding or coil 672, and for that prupose encloses a portion of the coil 672. A strain relief 686 formed in the insulation of a cord set 688 is shown in FIGS. 8 and 9 held between opposing annular walls 690 and 692, respectively, of housing halves 602 and 604 which, in turn, are releasably secured together by means of fasteners 694. Cord set 688 corresponds to the cord set 14 illustrated in FIG. 1.

FIG. 8 illustrates the printed circuit 644 in broken-line outline in the position it occupies atop the banger assembly 680 and the fixed contacts 636, 638. FIG. 8 further illustrates the three wires, phase/neutral 696 and the guard or sensing wire 698 which extend through and as part of cord set 688, through the strain relief 686, and into the confines of plug assembly 600. Sensing wire 698 corresponds to the third wire 22 of FIG. 1 which electrically communicates with a sensing wire in the load, such as sensing wire 24 of FIG. 1, and wire 698 is coupled to the PC board 644 while the phase and neutral lines are electrically secured to the fixed contact terminals 640 and 642. Terminals 640 and 642 are soft soldered to the PC board 644 by means of mounting tabs 700.

The present invention thus provides the user with a shock hazard protection system which has a response time that conforms to Underwriters Laboratories requirements; is trip free; possesses a double pole interrupting mechanism with an air gap switch; operates with reverse polarity; requries only a 2 pole receptacle; operates in an undergrounded environment, such as a plastic tub; is of a resonable size and cost; provides the user with a visible trip indication; meets Underwriters Laboratories overload, short circuit, and endurance requirements; possesses electrical noise immunity so as to minimize false tripping; provides protection in the event the cord is broken, with proper polarity assumed; provides adequate strain relief; is usable with a combination switch/receptacle; and provides protection whether the load or appliance switches are on or off, or are at medium or high settings.

The embodiments of the present invention herein described and disclosed are presented merely as examples of the invention. Other embodiments, forms and structures coming within the scope of this invention will readily suggest themselves to those skilled in the art, and shall be deemed to come within the scope of the appended claims.

While there has been shown, described, and pointed out the fundamental novel features of the invention as applied to the preferred embodiment, as is presently contemplated for carrying it out, it is to be understood that various omissions, substitutions, and changes of the form and details of the ivention illustrated and described herein and in its use and operation may be made by those skilled in the art, without departing from the spirit of the invention.

What is claimed is:

1. A circuit interrupting device for interrupting an electrical circuit between a source of AC energy and an electrical load upon the detection of an electrically conductive medium related to a shock hazard condition contained within said load comprising:
    a) a first service conductor connected between a source of AC power and a first input to a load;
    b) a first switch means in said first service conductor having a first closed position to pass AC power from said source to said load and a first open position where AC power is not passed to said load;
    c) a second service conductor connected between said source of AC power and a second input to said load;
    d) a second switch means in said second service conductor having a second closed position to pass AC power from said source to said load and a second open position where AC power is not passed to said load;
    e) a first shock hazard detection conductor having a supply end and a free end, said supply end of said first shock hazard detection conductor coupled to said first service conductor, wherein the first shock hazard detection conductor, responsive to immersion into water, conducts electrical current;
    f) a second shock hazard detection conductor having a second supply end and a second free end, wherein the second shock hazard detection conductor, responsive to immersion into water, conducts electrical current;
    g) a conductor having a first end and a second end, said second end coupled to said supply end of said second shock hazard detection conductor;
    h) a gate means having an input terminal, an output terminal and a control terminal, said first end of said conductor coupled to said control terminal of said gate means and said input terminal coupled to said first and second service conductors;
    i) a coil coupled to said first and second switch means for controlling the positions of said first and second switch means, said coil having a first end and a second end, said second end coupled to said output terminal of said gate means;
    j) a first set switch means coupled to said first service conductor at a first end and to said first end of said coil at a second end, said first set switch means having an open position to prevent the flow of current from either of the first or second shock hazard detection conductor, through said first service conductor, to said first end of said coil and a closed position to permit the flow of current from said first service conductor to said first end of said coil;
    k) a second set switch means coupled to said service conductor at a first end and to said second end of said coil at a second end, said second set switch means having an open position to prevent the flow of current from either of the first or second shock hazard detection conductor, through said second service conductor to said second end of said coil and a closed position to permit the flow of current from said second service conductor to said second end of said coil, whereby the moving of either the first and second set switch means or the first and second switch means to their closed positions causes current to flow in said coil and maintains said first and second switch means in their positions.

2. A circuit interrupting device as defined in claim 1, further comprising a diode coupled between said coil first end and said coil second end.

3. A circuit interrupting device as defined in claim 1, wherein said conductor contains a diode and a resistor therein and said first end is further coupled through a capacitor to said input terminal of said gate means.

4. A current interrupting device as defined claim 1, wherein said first end of said conductor is coupled to said first service conductor through a resistor and diode.

5. A current interrupting device as defined in claim 1, wherein said first set switch means is coupled to said first end of said coil through a diode.

* * * * *